(12) United States Patent  
Miller (10) Patent No.: US 9,753,225 B2  
(45) Date of Patent: Sep. 5, 2017

(54) PASSIVE ALIGNMENT OPTICAL CONNECTOR

(71) Applicant: Xyratex Technology Limited, Havant (GB)

(72) Inventor: Alistair Allen Miller, Emsworth (GB)

(73) Assignee: XYRATEX TECHNOLOGY LIMITED, Havant (GB)

( * ) Notice: Subject to any disclaimer, the term of this patent is extended or adjusted under 35 U.S.C. 154(b) by 0 days.

(21) Appl. No.: 14/972,384

(22) Filed: Dec. 17, 2015

(65) Prior Publication Data

US 2017/0176684 A1   Jun. 22, 2017

(51) Int. Cl.
*G02B 6/30* (2006.01)
*G02B 6/42* (2006.01)

(52) U.S. Cl.
CPC ............ *G02B 6/30* (2013.01); *G02B 6/4224* (2013.01); *G02B 6/4239* (2013.01); *G02B 6/4244* (2013.01); *G02B 6/4261* (2013.01)

(58) Field of Classification Search
None
See application file for complete search history.

(56) References Cited

U.S. PATENT DOCUMENTS

| 7,322,751 | B2 | 1/2008 | Hurt | |
| 8,391,657 | B2* | 3/2013 | Asahi | G02B 6/423 |
| | | | | 385/39 |
| 2006/0120673 | A1 | 6/2006 | Morlion et al. | |
| 2008/0226222 | A1* | 9/2008 | Kim | G02B 6/43 |
| | | | | 385/14 |
| 2016/0116695 | A1* | 4/2016 | Nekado | G02B 6/421 |
| | | | | 385/14 |
| 2017/0031112 | A1* | 2/2017 | Fish | G02B 6/1221 |

* cited by examiner

*Primary Examiner* — Michelle R Connelly
(74) *Attorney, Agent, or Firm* — Mueting, Raasch & Gebhardt, P.A.

(57) ABSTRACT

A system, apparatus, or method may include an optical connector that is configured to be fixed to a substrate including an optical waveguide. The substrate may also include a reference mark spaced away from the optical waveguide and extending from a substrate edge. The optical connector may define a first alignment aperture and a second alignment aperture through which the optical connector may be aligned with the substrate (e.g., the optical waveguide). The first alignment aperture may be configured to be aligned with the reference mark and the second alignment aperture may be configured to be aligned with the substrate edge.

20 Claims, 8 Drawing Sheets

PASSIVE ALIGNMENT OPTICAL CONNECTOR

The disclosure herein relates to systems, structures, apparatus, and methods for passively aligning ferrule mounts for optical connectors with optical waveguides of a substrate.

SUMMARY

The present disclosure relates to an optical connector (e.g., an MT ferrule mount) that may be combined with features of a substrate (e.g., glass substrate, printed circuit board, etc.) to align the optical connector with at least one waveguide (e.g., optical waveguide) of the substrate. For example, the substrate may use a target marker system to determine a first reference mark (e.g., a first alignment point) that may be used to align the optical connector before the optical connector is coupled (e.g., mounted) to a surface of the substrate. The substrate may only include one reference mark because an edge of the substrate may be used as a second alignment point to align the optical connector.

The optical connector may include apertures through which the optical connector may be visually and physically aligned with the reference mark and the edge of the substrate. The apertures may be tapered or may include magnifying lenses to help align the optical connector with the reference mark and the edge of the substrate.

An exemplary system may include a substrate and an optical connector. The substrate may include an optical waveguide extending along a longitudinal direction from a substrate edge and a reference mark spaced away from the optical waveguide and extending from the substrate edge. The optical connector may define a first alignment aperture and a second alignment aperture. The first alignment aperture may be configured to be aligned with the reference mark and the second alignment aperture may be configured to be aligned with the substrate edge.

An exemplary apparatus may include an optical connector configured to be fixed to a substrate. The optical connector may define a first alignment aperture and a second alignment aperture. The first alignment aperture may be configured to align with a reference mark spaced away from an optical waveguide on the substrate. The second alignment aperture may be configured to align with a substrate edge.

An exemplary method may include positioning an optical connector relative to a substrate. The substrate may include an optical waveguide extending along a longitudinal direction from a substrate edge and a reference mark spaced away from the optical waveguide and extending from the substrate edge. The method may also include aligning a first alignment aperture of the optical connector with the reference mark and aligning a second alignment aperture of the optical connector with the substrate edge. The method may further include fixing the optical connector to the substrate.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

The disclosure herein includes exemplary systems, apparatus, structures, and methods for aligning an optical connector with a waveguide on a printed circuit board (e.g., a substrate). An optical element (e.g., a ferrule, fibre optic connector end, etc.) may then be connected to (e.g., inserted into) the optical connector to optically connect or couple the optical element with the waveguide. The optical connector provides a stable foundation for the optical element to be inserted into and removed from the optical connector, repeatedly, while maintaining an accurate alignment or optical coupling with the waveguide. In other words, after the optical connector is aligned with the waveguide on the substrate, the optical element will be aligned or optically coupled with the waveguides each time the optical element is inserted into the optical connector.

The optical connector may be aligned with the waveguides of the substrate in a variety of different ways. Each waveguide is aligned with the optical connector such that the optical element inserted into the optical connector is also aligned with each waveguide. This may be accomplished through an active or passive alignment process. An active alignment of the optical connector includes positioning the optical connector with the waveguides until light passes through the waveguides to verify that the optical connector is accurately aligned. Active alignment may be time consuming. Conversely, passive alignment of the optical connector includes aligning the optical connector with the waveguides based on reference marks on the waveguide substrate. Alignment may be verified using an active alignment process, but each subsequent optical connector may forgo active alignment. Instead, the optical connector may be aligned with the waveguides using the reference marks and using, e.g., any offset information gleaned from the verification through the additional and optional active alignment process.

Regardless of the method of aligning the optical connector, the optical connector is restricted from motion along the six degrees of freedom (e.g., three linear directions and three rotational directions) to properly constrain the optical connector relative to the substrate. For example, the optical connector may rest on a plane of the substrate that includes the waveguides, which constrains one linear direction and two rotational directions of the optical connector. Reference marks may then be used to constrain the remaining degrees of freedom of the optical connector.

The exemplary methods, apparatus, structures, and systems described herein provide an optical connector that is aligned with waveguides located on a substrate using a minimal number of reference markings. For example, the substrate may include only one reference mark to assist in aligning the optical connector. The optical connector may then use an existing feature of the substrate (e.g., an edge of the substrate) to further align the optical connector and restrict the remaining degrees of freedom. Alternatively, the optical connector may include at least one alignment feature that is configured to be received by the substrate. In the exemplary embodiments described herein, only one reference marking is created on the substrate.

Figure 1:
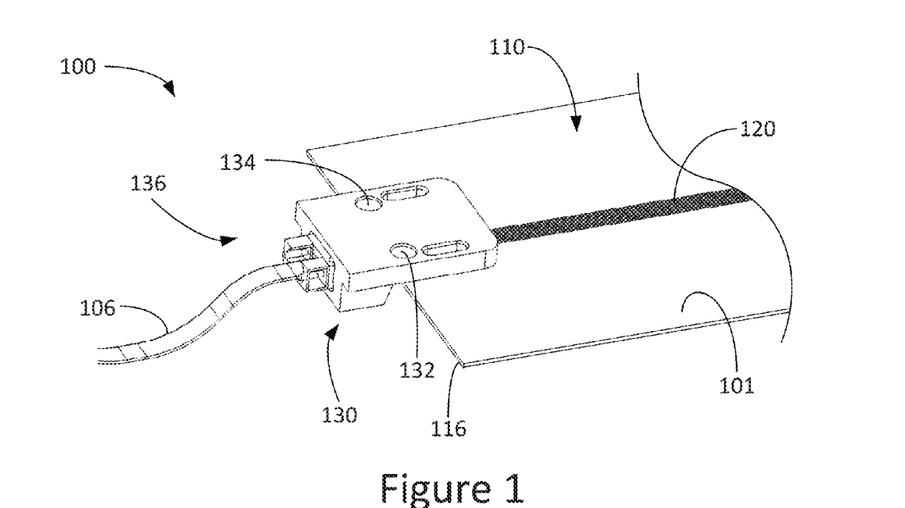
FIG. 1 is a perspective view of an exemplary optical connector coupled to an exemplary substrate.

An exemplary system 100 including an optical connector 130 (e.g., ferrule mount) and a substrate 110 (e.g., a glass substrate) including at least one waveguide 120 (e.g., optical waveguide(s)) is depicted in FIG. 1. The optical connector 130 may be positioned relative to the substrate 110 such that the waveguides 120 located on or in the substrate 110 may be aligned with the optical connector 130. Specifically, the optical connector 130 may be positioned relative to the substrate 110 such that an optical element 106 may be aligned with the waveguides 120 when the optical element 106 is received by (e.g., inserted into, coupled to, etc.) the optical connector 130. In other words, fibers of the optical element 106 may be directly aligned with the waveguides 120 and, e.g., connect to the ends of the waveguides 120. The optical element 106 may then be repeatedly inserted and removed from the optical connector 130 and each time the optical element 106 is inserted into the optical connector 130, the optical element 106 would be properly aligned with the waveguides 120.

The optical connector 130 may be positioned on a top surface 101 of the substrate 110 and positioned relative to the waveguides 120. The optical connector 130 may be aligned with the waveguides 120 in any suitable way. For example, alignment features of the optical connector 130 may be positioned relative to alignment features of the substrate 110 to align the optical connector 130. Specifically, the optical connector 130 may define a first alignment aperture 132 and a second alignment aperture 134 that are each configured to be aligned with the substrate 110. After the optical connector 130 is aligned with the waveguides 120, the optical connector 130 is coupled to the substrate 110 using an adhesive such as, e.g., an UV light curable resin (e.g., that bonds quickly or within seconds). In other words, the system 100 may include an adhesive configured to fix the optical connector 130 to the substrate 110.

The optical connector 130 may also define a receptor element 136 located within the optical connector 130 opposite the substrate 110. The receptor element 136 may be configured to receive and optically couple the optical element 106 with the waveguides 120. When received by the receptor element 136 of the optical connector 130, fibers of the optical element 106 may be aligned (e.g., directly aligned) with the waveguides 120 of the substrate 110. In one or more embodiments, the optical element 106 may be in contact with the substrate 110 at the substrate edge 116 when the optical element 106 is received by the receptor element 136. The optical element 106 may include pins (e.g., ferrule mount pins) protruding from the optical element 106 that are configured to align the optical element 106 with the optical connector 130 and/or the substrate 110.

Figure 2:
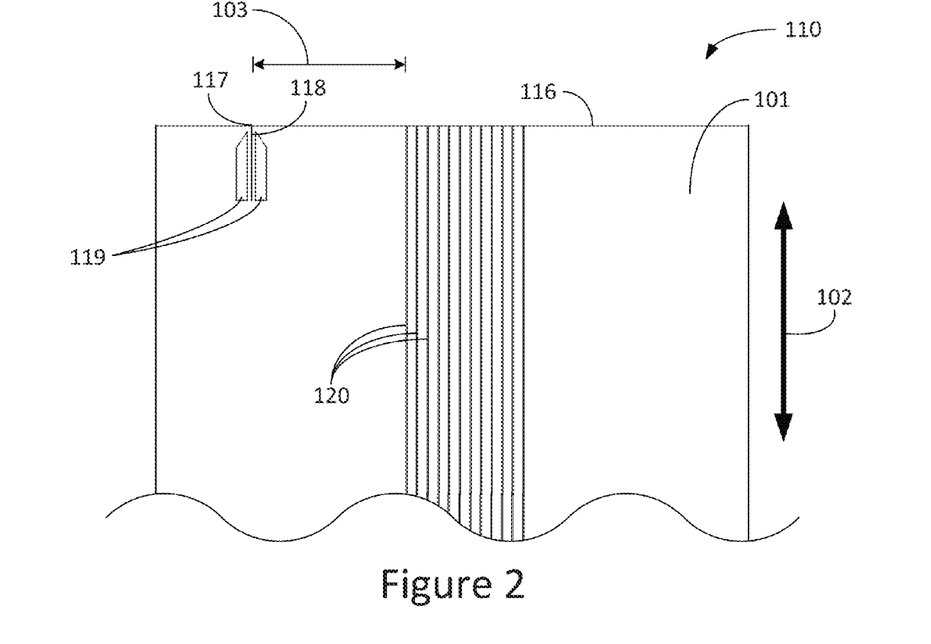
FIG. 2 is a top view of the exemplary substrate of FIG. 1.

An exemplary substrate 110 includes a reference mark 118 to align the optical connector 130 with the waveguides 120 as illustrated in FIG. 2. The substrate 110 may include any type of printed circuit board such as, e.g., an electro-optical printed circuit board, an optical printed circuit board, etc. In one or more embodiments, the waveguides 120 may be located on or in between printed board material. For example, the printed board material may be glass (e.g., a sheet) or polymer that may be embedded with the printed circuit board. In one or more embodiments, the substrate 110 may include a plurality of integrated circuits coupled thereto. The substrate 110 may include at least one optical waveguide 120 within the substrate 110.

The at least one optical waveguide 120 may include, e.g., multimode waveguides, single mode waveguides, etc. The optical waveguides 120 may extend along a longitudinal direction 102 from a substrate edge 116 of the substrate 110. The optical waveguides 120 may define a variety of cross-sectional shapes such as, e.g., square, rectangular, trapezoidal, etc. The optical waveguides 120 also may define various heights/widths such as, e.g., about 1-100 micrometers, about 2-25 micrometers (e.g., single mode waveguides), about 35-75 micrometers (e.g., multimode waveguides), etc. The small size of the optical waveguides 120 may make the optical waveguides 120 more difficult to align.

Figure 4:
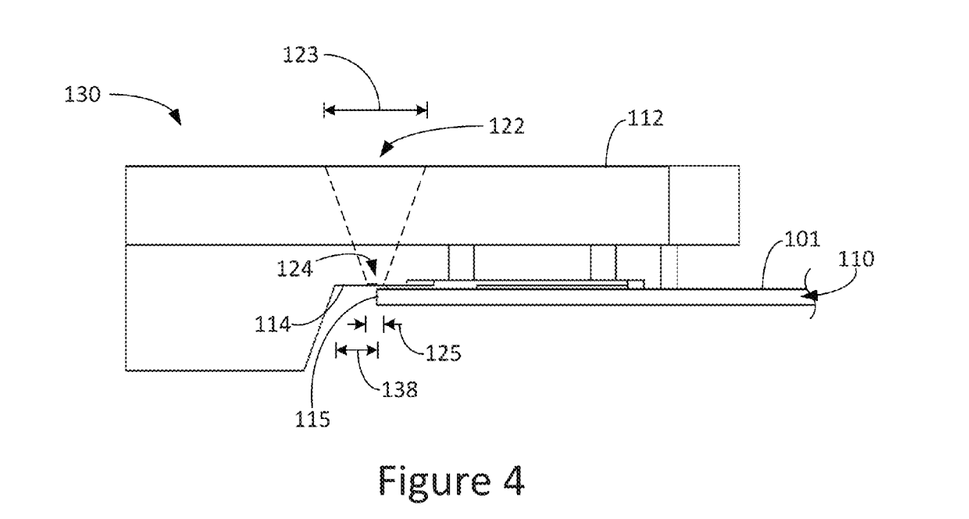
FIG. 4 is a side view of the exemplary optical connector of FIG. 3.

The substrate edge 116 of the substrate 110 may be described as being defined by the top surface 101 of the substrate 110 and an edge surface 115 (as shown in FIG. 4) of the substrate 110. In one or more embodiments, the substrate edge 116 may be defined due to cutting or cleaving the edge of the substrate 110. The substrate 110 is cut or cleaved to create a clean edge (e.g., the substrate edge 116) from which the optical waveguides 120 begin/end. As shown, the substrate edge 116 is perpendicular to the optical waveguides 120.

In one or more embodiments, the substrate 110 may include one or more materials such as, e.g., glass, polymer, etc. For example, in a polymer substrate, the waveguides may include a high index of refraction polymer within a lower index of refraction cladding polymer. In one or more embodiments, the substrate 110 may define a thickness of about, e.g., 0.5 millimeters.

The substrate 110 may also include a reference mark 118 on a top surface 101 of the substrate and spaced away from the optical waveguides 120 and extending from the substrate edge 116. In one or more embodiments, the reference mark 118 may extend perpendicular to the substrate edge 116. The reference mark 118 may extend for about, e.g., less than or equal to 4 millimeters, less than or equal to 3 millimeters, less than or equal to 2 millimeters, etc. The point at which the reference mark 118 intersects with the substrate edge 116 may define an intersection 117. The intersection 117 may help to align the optical connector 130 with the substrate 110. In one or more embodiments, the intersection 117 may be described as a "T-shape" due to the appearance of the reference mark 118 intersecting with the substrate edge 116.

The reference mark 118 may be positioned on either side of the optical waveguides 120 and may take any form or shape. As shown in FIG. 2, the reference mark 118 is a thin line extending from the substrate edge 116 and parallel to the optical waveguides 120. The reference mark 118 may define a width of, e.g., less than or equal to 50 micrometers, less than or equal to 40 micrometers, less than or equal to 30 micrometers, less than or equal to 20 micrometers, less than or equal to 10 micrometers, etc. The substrate 110 may also include identification marks 119 positioned relative to the reference mark 118 to aid in identifying the location of the reference mark 118, e.g., from a distance. For example, as shown in FIG. 2, the identification marks 119 include two pointed blocks positioned on either side of the reference mark 118.

The reference mark 118 may be spaced apart from the optical waveguides 120 by a reference mark distance 103. In one or more embodiments, the reference mark distance 103 may be measured from the nearest optical waveguide 120. The reference mark distance 103 corresponds with a distance on the optical connector 130 between an alignment feature of the optical connector 130 and a position on the optical connector 130 with which the optical waveguide 120 should be aligned. In other words, the reference mark distance 103 and the optical connector 130 are coordinated such that alignment of the reference mark 118 and the optical connector 130 results in alignment of the optical waveguides 120 and the optical connector 130. In one or more embodiments, the farther the reference mark 118 is away from the optical waveguides 120, the optical connector 130 (e.g., the second alignment aperture 134) may define better angular tolerances when the optical connector 130 is rotated about the first alignment aperture 132, as discussed herein.

In one or more embodiments, the reference mark 118 may be created at the same time and/or with the same mask that creates the optical waveguide features, and therefore, may be the same distance away from the optical waveguides 120 on each substrate 110 manufactured. The reference mark 118 may be defined in a variety of different ways. For example, the reference mark 118 may printed or chemically deposited next to the optical waveguides 120.

Figure 3:
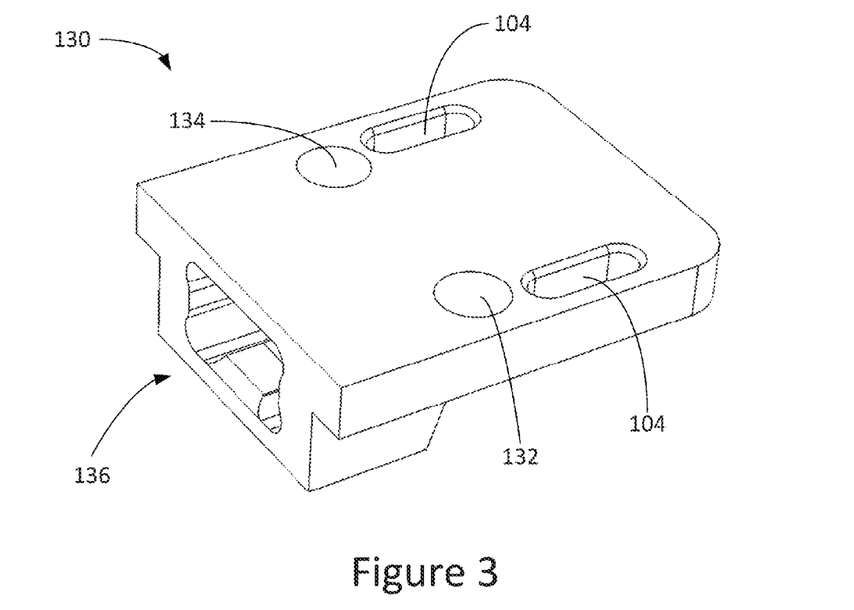
FIG. 3 is a perspective view of the exemplary optical connector of FIG. 1.

The reference mark 118 of the substrate 110 may be used to help align the optical waveguides 120 of the substrate 110 with an optical connector 130 as shown in FIG. 3. The optical connector 130 may include (e.g., be formed of) one or more materials such as, e.g., polycarbonate, acrylic, polyimide, polyetherimide, etc. The optical connector 130 may be precision machined or, e.g., preferably, precision injection molded such that the manufacturing of the optical connector 130 may be created accurately and in a repeatable manner. Consistency between multiple manufactured optical connectors 130 allows each optical connector 130 to be easily aligned with the optical waveguides 120 in the same way. In other words, if an initial alignment between the optical connector 130 and the optical waveguides 120 notes an offset from the reference mark 118 to be properly aligned, each subsequent optical connector 130 may be aligned considering that offset. The consistency between multiple optical connectors 130 may provide a common offset that may be used to properly align each optical connector 130 with the optical waveguides 120.

The optical connector 130 may include anything suitable to help in aligning the optical connector 130 and the substrate 110. For example, the optical connector 130 may include at least two alignment features (e.g., alignment apertures, protrusions) to be aligned with the optical waveguides 120. Specifically, the optical connector 130 defines a first alignment aperture 132 and a second alignment aperture 134. The first and second alignment apertures 132, 134 may be aligned (e.g., positioned relative to) features of the substrate 110 to align the optical connector 130 with the optical waveguides 120. For example, the first alignment aperture 132 of the optical connector 130 may be aligned with a feature of the substrate 110 (e.g., reference mark 118) and then the optical connector 130 may be rotated about that alignment feature until the second alignment aperture 134 of the optical connector 130 is aligned with another feature of the substrate 110 (e.g., the substrate edge 116). The features of the substrate 110 that are used to align the optical connector 130 may be any marking on the substrate 110 or any other feature of the substrate 110. For example, the first alignment aperture 132 may be aligned with the reference mark 118 of the substrate 110 and the second alignment aperture 134 may be aligned with the substrate edge 116.

The optical connector 130 may further include at least one adhesive aperture 104. The at least one adhesive aperture 104 may be configured to receive adhesive to couple (e.g., mount) the optical connector 130 to the substrate 110. After the first and second alignment apertures 132, 134 are aligned with the substrate 110, the optical connector 130 is coupled to the substrate (e.g., contacting the substrate 110 through height pads on the optical connector 130). The adhesive may include any material suitable for coupling the optical connector 130 to the substrate 110. For example, the adhesive may include a photo curable adhesive such as an ultraviolet curable adhesive.

Additionally, the optical connector 130 may define a receptor element 136, as illustrated in FIG. 3, which is configured to receive the optical element 106. The receptor element 136 may define an aperture in the optical connector 130 that provides a space for the optical element 106 to be inserted into the optical connector 130. In one or more embodiments, the receptor element 136 may be spaced apart from the substrate edge 116 such that the optical element 106 may extend through the receptor element 136 to a position adjacent the substrate edge 116 to optically couple the optical element 106 to the optical waveguides 120.

The optical connector 130 may define a top surface 112 and a bottom surface 114 opposing the top surface 112, as shown in FIG. 4. Each of the first and second alignment apertures 132, 134 may extend through the optical connector 130 from the top surface 112 of the optical connector 130 to the bottom surface 114 of the optical connector 130. For example, each of the first and second alignment apertures 132, 134 may define a bottom opening 124 at the bottom surface 114 and a top opening 122 at the top surface 112. The first and second alignment apertures 132, 134 may define any shape through the optical connector 130. As shown in FIG. 4, the first and second alignment apertures 132, 134 define a tapered shape. In other words, a bottom diameter 125 of the bottom opening 124 of the first and second alignment apertures 132, 134 is smaller than a top diameter 123 of the top opening 122 of the first and second alignment apertures 132, 134. In one or more embodiments, the top and bottom diameters 123, 125 may be about or substantially equal.

In one or more embodiments, the optical connector 130 may be positioned relative to the top surface 101 of the substrate 110 and an edge surface 115 of the substrate 110. For example, as shown in FIG. 4, the optical connector is positioned on the top surface 101 of the substrate 110, but spaced away from an edge surface 115 of the substrate 110 by a gap distance 138. In other words, the optical connector 130 may not be constrained from motion in a linear direction because of the edge surface 115 (e.g., not in contact with the edge surface 115). Furthermore, the optical element 106 (shown in FIG. 1) may span (e.g., close) the gap distance 138 when inserted into the receptor element 136 of the optical connector 130 to optically couple the optical element 106 with the waveguides 120. In one or more embodiments, it may be described that the receptor element 136 is spaced apart from the edge surface 115 of the substrate 110 by the gap distance 138.

Figure 5A:
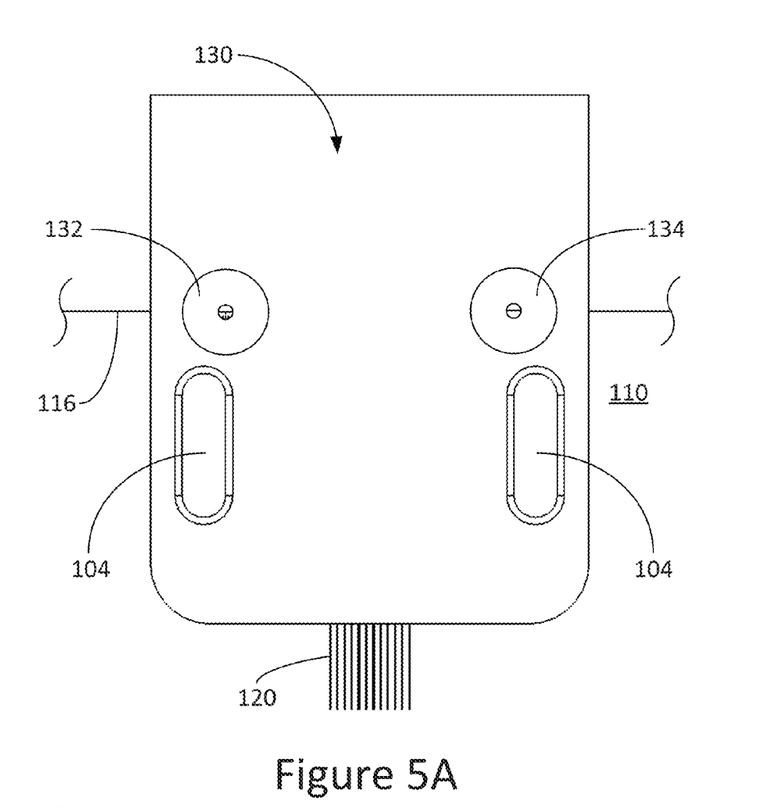
FIG. 5A is a top view of the exemplary optical connector of FIG. 3.

A top view of the optical connector 130 positioned over and aligned with the substrate 110 is illustrated in FIG. 5A. The first and second alignment apertures 132, 134 may be aligned with the substrate 110 such that the optical connector 130 is aligned with the optical waveguides 120. Also, as shown in FIG. 5A, the at least one adhesive aperture 104 (e.g., access slots) may be positioned over the substrate 110 such that adhesive disposed in the at least one adhesive aperture 104 may couple the optical connector 130 to the substrate 110 (e.g., after the optical connector 130 is aligned). In one or more embodiments, the optical connector 130 may define any number of adhesive apertures 104, e.g., one, two, three, four, five, etc. adhesive apertures.

Figure 5B:
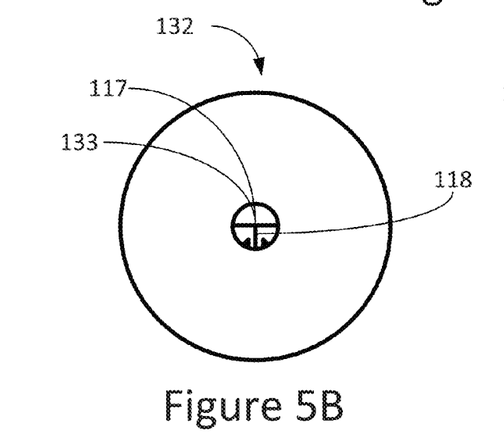
FIG. 5B is an expanded view of an alignment aperture of the exemplary optical connector of FIG. 5A.

As shown in FIG. 5B, the first alignment aperture 132 may be aligned (e.g., visually aligned, physically aligned, etc.) or configured to be aligned with the reference mark 118. For example, the first alignment aperture 132 may be aligned or configured to be aligned with the intersection 117 between the substrate edge 116 and the reference mark 118. Specifically, the first alignment aperture 132 may be aligned with the intersection 117 using, e.g., a vision system that is configured to determine (e.g., calculate) a first alignment center point 133 of the first alignment aperture 132 to center the intersection 117 in the first alignment aperture 132. The tapered shape of the first alignment aperture 132 may assist in determining the first alignment center point 133 by producing concentric circles (e.g., from the top surface 112 and the bottom surface 114 of the optical connector 130) that are concentric about the first alignment center point 133 and the intersection 117 after alignment.

Figure 5C:
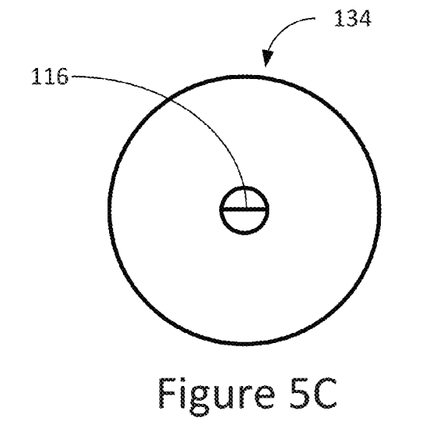
FIG. 5C is an expanded view of another alignment aperture of the exemplary optical connector of FIG. 5A.

After the first alignment aperture 132 is aligned with the intersection 117, the second alignment aperture 134 may be aligned (e.g., visually aligned, physically aligned, etc.) with the substrate edge 116 as shown in FIG. 5C. For example, the optical connector 130 may be rotated about the point of intersection 117 until the second alignment aperture 134 is aligned with the substrate edge 116. The second alignment aperture 134 may be considered aligned with the substrate edge 116 when the substrate edge 116 extends between the middle of the bottom opening 124 of the second alignment aperture 134 (e.g., "cuts" the second alignment aperture 134 in half).

Alignment of the first and second alignment apertures 132, 134 of the optical connector 130 may account for the remaining three degrees of freedom as discussed herein (with the first three degrees of freedom constrained by the optical connector 130 positioned on the top surface 101 of the substrate 110 as discussed above). For example, aligning the first alignment aperture 132 with the intersection 117 constrains the optical connector 130 from movement in the linear direction along the longitudinal direction 102 and perpendicular to the longitudinal direction 102 (e.g., parallel to the substrate edge 116). The remaining degree of freedom for the optical connector 130 is a rotational motion about the intersection 117. Therefore, the optical connector 130 is rotated about the intersection until the second alignment aperture 134 is aligned with the substrate edge 116. After the second alignment aperture 134 is in position, all of the six degrees of freedom of the optical connector 130 are constrained. It is noted that the first three degrees of freedom discussed herein may be constrained by positioning the optical connector 130 on the top surface of the substrate 110 after the first and second alignment apertures 132, 134 are aligned.

Figure 6A:
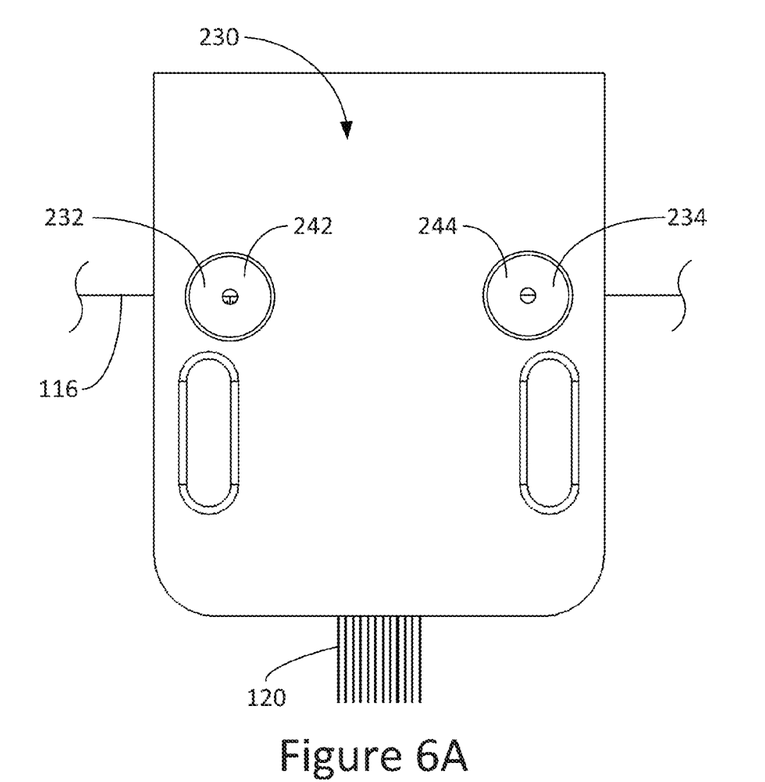
FIG. 6A is a top view of an exemplary optical connector including lenses.
Figure 6B:
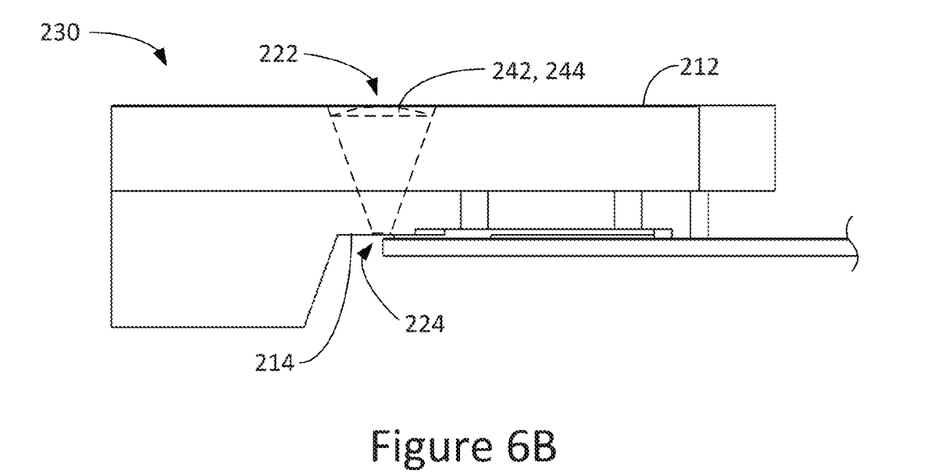
FIG. 6B is a side view of the exemplary optical connector of FIG. 6A.

Another exemplary optical connector 230 configured to be aligned with optical waveguides 120 of a substrate 110 is illustrated in FIGS. 6A-6B. The optical connector 230 defines a first alignment aperture 232 and a second alignment aperture 234 positioned to align the optical connector 230 with the optical waveguides 120. Further, the optical connector 230 may include lenses disposed within either or both of the first and second alignment apertures 232, 234 to magnify features of the substrate 110 to align the optical connector 230 with the substrate 110. For example, a first lens 242 may be positioned within the first alignment aperture 232 and a second lens 244 may be positioned within the second alignment aperture 234.

The first and second lenses 242, 244 may be variety of different types of lenses configured to magnify the alignment features of the substrate 110 (or, e.g., magnify anything visible through the first and second lenses 242, 244). For example, the first and second lenses 242, 244 may include a convexly curved lens surface. The first and second lenses 242, 244 may be, e.g., molded using one or more materials such as, e.g., a clear material, acrylic, polycarbonate, polyimide, polyetherimide, etc. The first and second lenses 242, 244 may magnify (e.g., enlarge) the bottom opening 224 and magnify (e.g., enlarge) features of the substrate 110 such that the magnified bottom opening 224 may produce a larger indicator with which the larger features of the substrate 110 may be focused (e.g., a circular bottom opening 224 may produce a larger circle and larger features of the substrate 110 to improve the alignment accuracy and precision).

The first and second lenses 242, 244 may be positioned anywhere within the first and second alignment apertures 232, 234. For example, the first and second lenses 242, 244 may be located anywhere between the top surface 212 of the optical connector 230 and the bottom surface 214 of the optical connector 230. As shown in FIGS. 6A-6B, the first lens 242 is positioned in the first alignment aperture 232 on or adjacent (e.g., molded into) the top surface 212 (e.g., at the top opening 222 of the first alignment aperture 232) and the second lens 244 is positioned in the second alignment aperture 234 on or adjacent (e.g., molded into) the top surface 212 (e.g., at the top opening 222 of the second alignment aperture 234). The first and second lenses 242, 244 may be configured to magnify the reference mark 118 and the substrate edge 116, respectively, to improve alignment accuracy.

In one or more embodiments, the first and second lenses 242, 244 may magnify a point or spot on a bottom window of the bottom opening 224 corresponding to each of the first and second apertures 232, 234 to improve alignment between the optical connector 230 and the substrate 110. For example, the point or spot may be proximate the bottom opening 224 and created by, e.g., adding a small drill point feature to the bottom window. The small drill point feature may either stick out of or into the bottom opening 224. The small drill point feature may assist the vision aligning system in calculating a center point of each of the first and second alignment apertures 232, 234 to be aligned with features of the substrate 110.

Figure 7A:
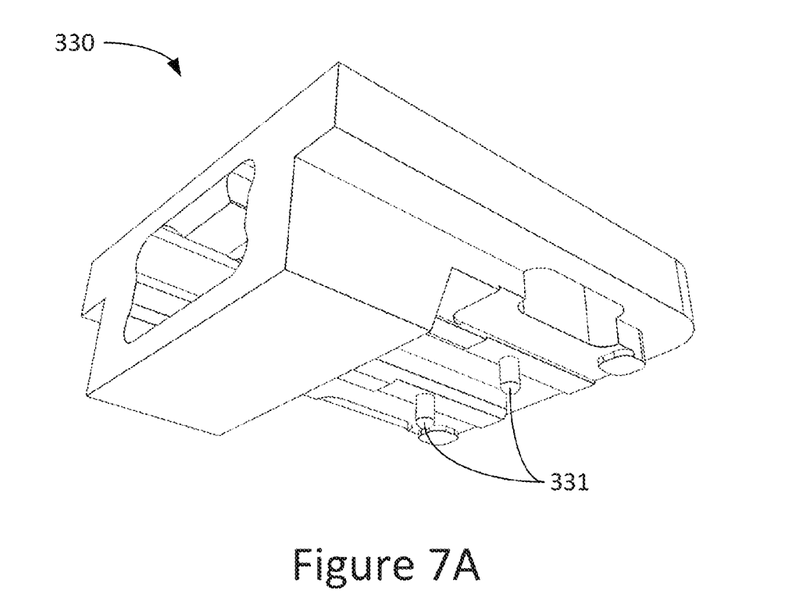
FIG. 7A is a perspective view on an exemplary optical connector including alignment features.
Figure 7B:
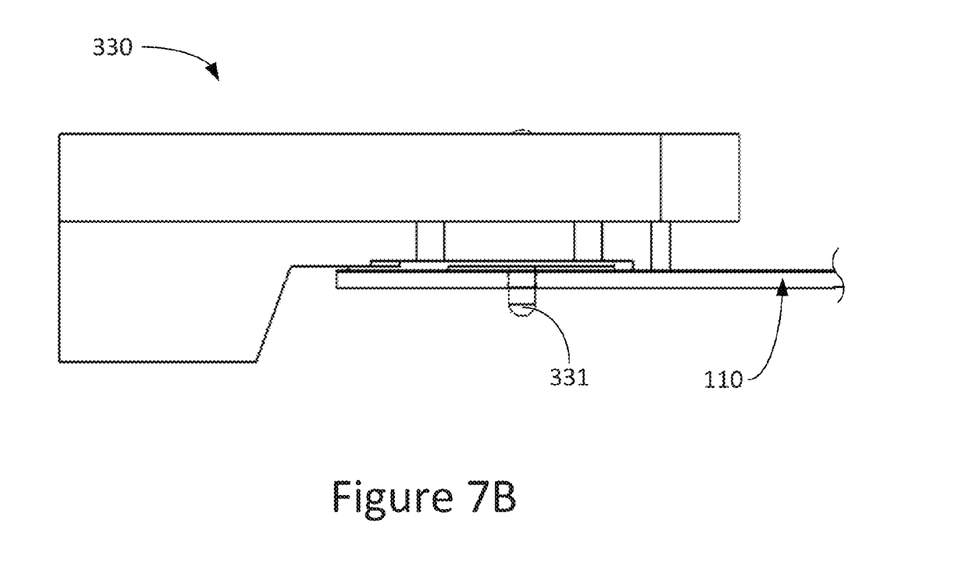
FIG. 7B is a side view of the exemplary optical connector of FIG. 7A.

Yet another exemplary optical connector 330 configured to be aligned with optical waveguides 120 of a substrate 110 is illustrated in FIGS. 7A-7B. The optical connector 330 may include at least one alignment feature 331 (e.g., a protrusion, a pin, etc.) that is configured to extend into the substrate 110. The at least one alignment feature 331 may define a diameter of about, e.g., 0.7 millimeters. As shown in FIG. 7A, the optical connector 330 includes two alignment features 331.

Figure 8:
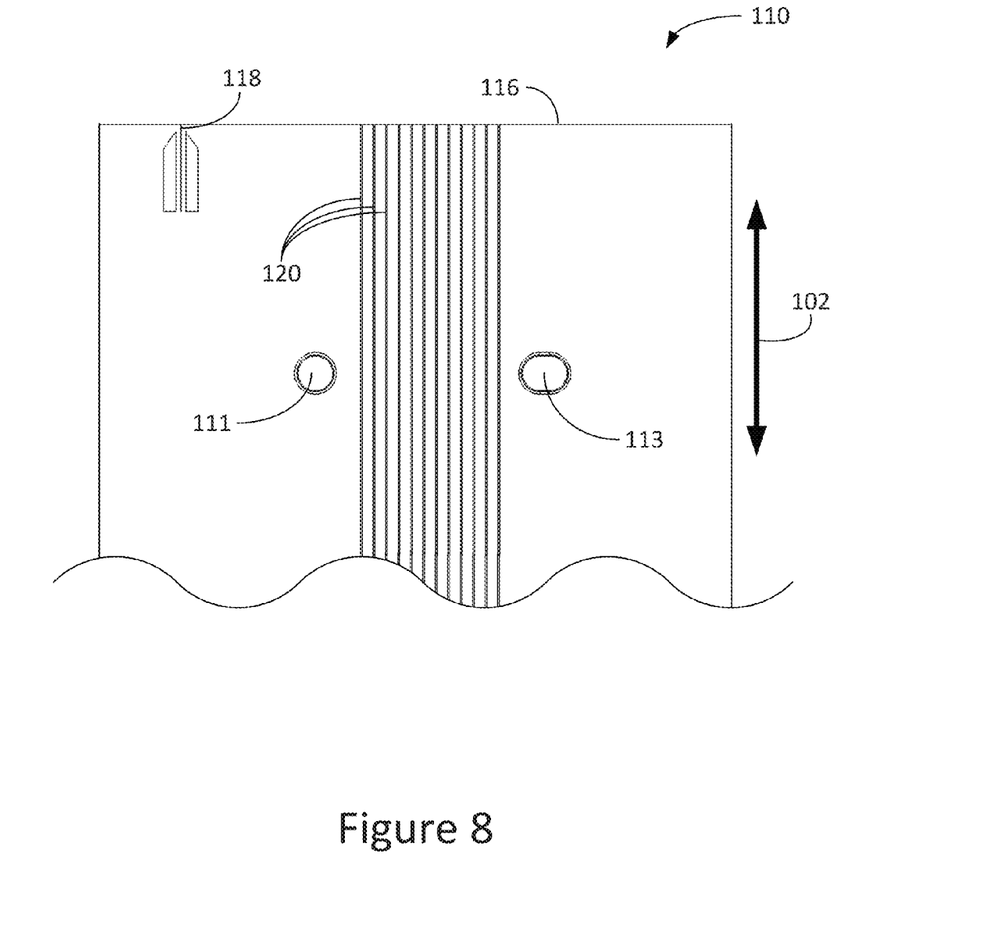
FIG. 8 is a top view of an exemplary substrate configured to align with the exemplary optical connector of FIG. 7A.

The alignment features 331 of the optical connector 330 are configured to be inserted into (e.g., received by) alignment apertures 111, 113 of substrate 110 illustrated in FIG. 8. The alignment apertures 111, 113 defined by the substrate 110 may be spaced away from the substrate edge 116 and configured to align the optical connector 330 with the optical waveguides 120. The alignment apertures 111, 113 may be spaced apart along a direction perpendicular to the longitudinal direction 102. In one or more embodiments, the alignment apertures 111, 113 may define chamfered or rounded edges (e.g., radiused) on the top and bottom (e.g., creating an "hourglass" shape) to help guide the alignment features 331 there through. The chamfered or rounded edges may provide the ability for the alignment features 331 to be rocked into the alignment apertures 111, 113 and may help correct any misalignment of the alignment features 331 with the center of the alignment apertures 111, 113. The alignment features 331 and alignment apertures 111, 113 may be used in combination with or separate from the reference mark 118 as described herein.

The first alignment aperture 111 may be defined by a circular shape and the second alignment aperture 113 may be defined by an elongated or oblong or obround shape, as illustrated in FIG. 8. The first alignment aperture 111 may define a diameter of about, e.g., 0.0702 millimeters (e.g., at the narrowest point), and the second alignment aperture 113 may define dimensions of about, e.g., 0.0702 millimeters (e.g., at the narrowest point) by 1.0 millimeter. The second alignment aperture 113 may be defined by an elongated shape due to manufacturing tolerances of the alignment features 331 of the optical connector 330. In other words, the elongated shape of the second alignment aperture 113 provides some amount of flexibility (e.g., lateral movement) for the exact spacing between the alignment features 331. However, in one or more embodiments, both of the first and second alignment apertures 111, 113 may be defined by a circular shape.

The alignment features 331 may constrain the motion of the optical connector 330 from moving in undesired directions while aligning the optical connector 330 with the optical waveguides 120. The motion of the optical connector 330 may be constrained in a direction along the longitudinal axis 102 and perpendicular to the longitudinal axis 102 because the alignment feature 331 is positioned in the first alignment aperture 111. The rotational motion of the optical connector 330 may be constrained because the alignment feature 331 is positioned in the second alignment aperture 113.

Figure 9:
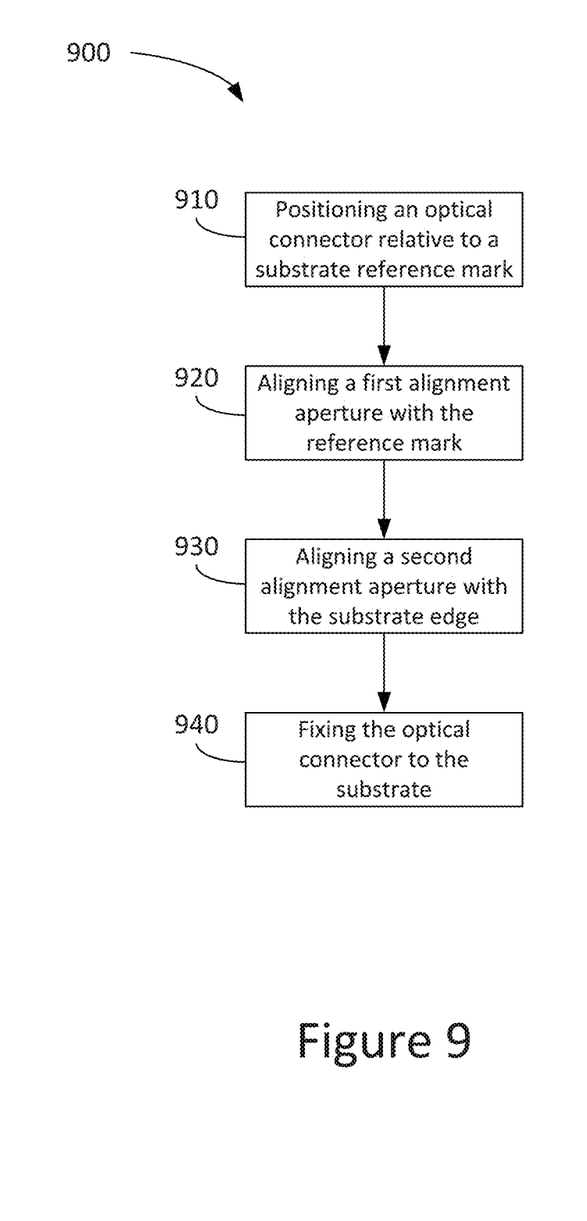
FIG. 9 is a method of aligning an optical connector with a substrate.

FIG. 9 illustrates a method 900 of passively aligning an optical connector with optical waveguides of a substrate (e.g., a printed circuit board, optical circuit board, etc.). The method 900 includes positioning 910 the optical connector relative to the substrate. The substrate may include optical waveguides extending along a longitudinal direction from a substrate edge (e.g., perpendicular to the substrate edge) and a reference mark spaced away from the optical waveguides and extending from the substrate edge (e.g., along the longitudinal direction). The method 900 may also include aligning 920 a first alignment aperture of the optical connector with the reference mark (e.g., using a vision system at an intersection between the reference mark and the substrate edge) and aligning 930 a second alignment aperture of the optical connector with the substrate edge. The method 900 may further include fixing 940 (e.g., coupling, adhering, mounting, etc.) the optical connector to the substrate (e.g., using a photo curable adhesive).

In one or more embodiments, the fixing 940 of the optical connector to the substrate may include curing a photo curable adhesive between the optical connector and the substrate (e.g., to mount or couple the optical connector to the substrate). In one or more embodiments, the aligning 920 of the first alignment aperture of the optical connector may include aligning a center of the first alignment aperture with an intersection of the reference mark and the substrate edge. In one or more embodiments, the method 900 may also include cleaving the substrate perpendicular to the longitudinal direction to define (e.g., to form) the substrate edge prior to the positioning 910 of the optical connector relative to the substrate. In one or more embodiments, the aligning 930 of the second alignment aperture may include rotating the optical connector about the reference mark to align the second alignment aperture with the substrate edge after the aligning 920 of the first alignment aperture with the reference mark.

Figure 10:
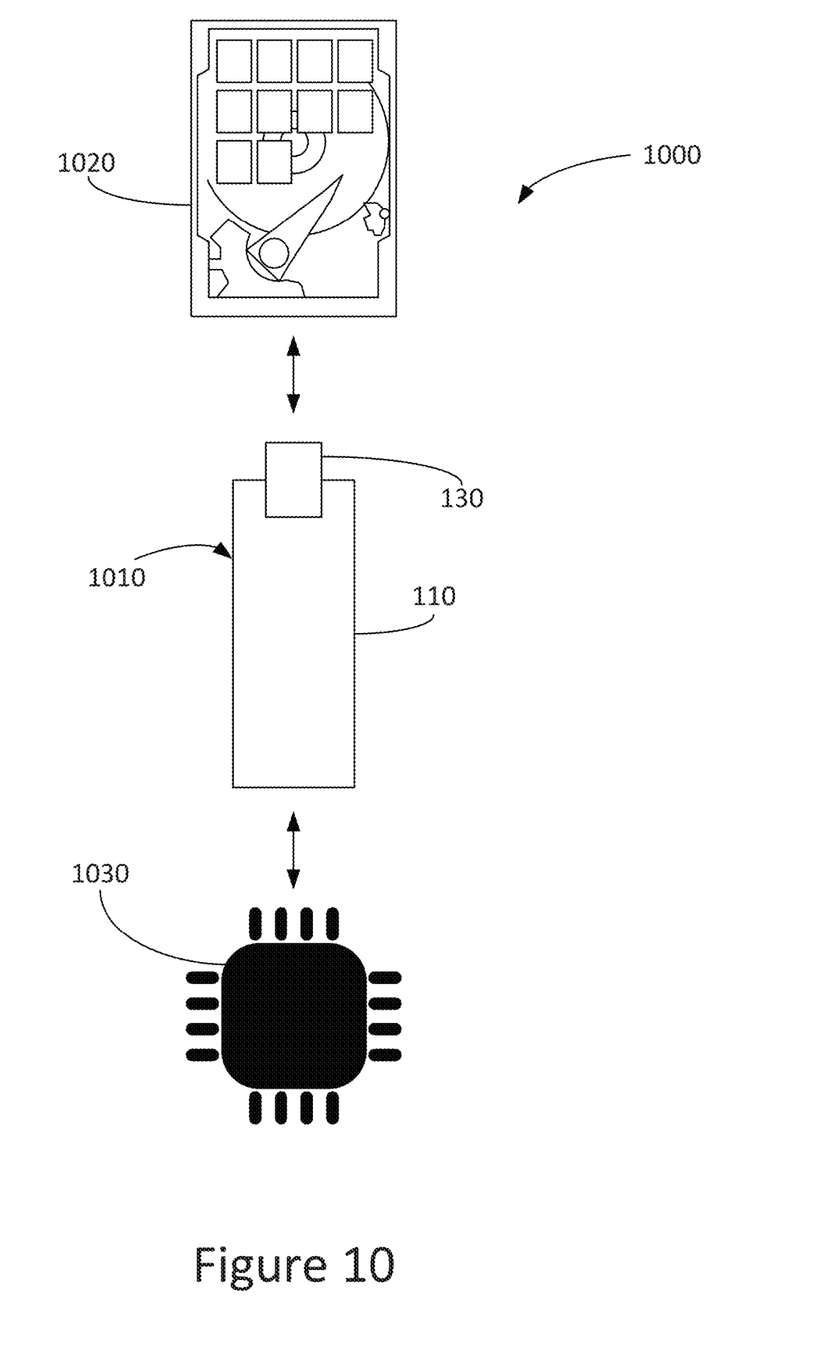
FIG. 10 is a schematic diagram of an exemplary system including an optical connector.

FIG. 10 is a schematic diagram of an illustrative system 1000 including an optical circuit board 1010 (e.g., an optical connector 130 coupled to a substrate 110) as described herein. The system 1000 may further include a first component 1020 coupled to the optical circuit board 1010 (e.g., through the optical element 106 of FIG. 1). Also, the system 1000 may include second component 1030 coupled to the optical circuit board 1010 (e.g., through the optical element 106 of FIG. 1). The arrows there between may represent signal or data transmission between the system 1000 components (e.g., the optical circuit board 1010, the first component 1020, the second component 1030).

The first component 1020 and the second component 1030 may be any useful component. For example, the first component 1020 may be a storage device (e.g., a data storage device, a hard disc drive, a solid state drive, a hybrid drive) and the second component 1030 may be a computing device (such as, e.g., a processor, network, etc.). The first component 1020 and the second component 1030 may be modular components of an optical backplane, midplane, or frontplane for a data storage device or other computing or communication element.

In the preceding description, reference is made to the accompanying set of drawings that form a part hereof and in which are shown by way of illustration several specific embodiments. It is to be understood that other embodiments are contemplated and may be made without departing from (e.g., still falling within) the scope or spirit of the present disclosure. The preceding detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

It is noted that terms such as "top", "bottom", "above", "below", etc. may be used in this disclosure. These terms should not be construed as limiting the position or orientation of a structure, but should be used as providing spatial relationship between the structures.

Embodiments of the systems, apparatus, structures, and methods for aligning optical connectors with substrate waveguides. The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

What is claimed:

1. A system comprising:
   a substrate comprising an optical waveguide extending along a longitudinal direction from a substrate edge and a reference mark spaced away from the optical waveguide and extending from the substrate edge; and
   an optical connector defining a first alignment aperture and a second alignment aperture, and the optical connector defining a top surface and a bottom surface opposing the top surface, each of the first and second alignment apertures define a bottom opening at the bottom surface and a top opening at the top surface, the first alignment aperture is configured to be aligned with the reference mark and the second alignment aperture is configured to be aligned with the substrate edge.

2. The system of claim 1, wherein the first alignment aperture defines a first alignment center point and the reference mark intersects the substrate edge to define an intersection, wherein the first alignment center point is configured to be aligned with the intersection.

3. The system of claim 1, wherein the bottom surface faces the substrate, wherein a bottom diameter of the bottom opening is smaller than a top diameter of the top opening.

4. The system of claim 3, wherein the optical connector comprises a first lens positioned in the first alignment aperture on or adjacent the top surface and a second lens positioned in the second alignment aperture on or adjacent the top surface, wherein each of the first and second lenses is configured to magnify the reference mark and substrate edge for alignment, respectively.

5. The system of claim 1, wherein the substrate defines at least one substrate alignment aperture spaced away from the substrate edge, wherein the at least one substrate alignment aperture is configured to receive an alignment feature of the optical connector.

6. The system of claim 5, wherein the at least one substrate alignment aperture is defined by a circular shape.

7. The system of claim 5, wherein the optical connector comprises a receptor element configured to receive and optically couple an optical element with the optical waveguide, wherein the receptor element is spaced apart from the edge surface of the substrate by the gap distance.

8. The system of claim 1, wherein the substrate edge is defined by a top surface of the substrate and an edge surface of the substrate, wherein the reference mark is positioned on the top surface of the substrate, wherein the optical connector is spaced apart a gap distance from the edge surface of the substrate.

9. An apparatus comprising:
   an optical connector configured to be fixed to a substrate and defining a first alignment aperture and a second alignment aperture, and the optical connector defining a top surface and a bottom surface opposing the top surface, each of the first and second alignment apertures define a bottom opening at the bottom surface and a top opening at the top surface, the first alignment aperture configured to align with a reference mark spaced away from an optical waveguide on the substrate and the second alignment aperture configured to align with a substrate edge.

10. The apparatus of claim 9, wherein the first alignment aperture defines a first alignment center point and the reference mark intersects the substrate edge to define an intersection, wherein the first alignment center point is aligned with the intersection.

11. The apparatus of claim 9, wherein the optical connector comprises a first lens positioned on or within the first alignment aperture and a second lens positioned on or within the second alignment aperture, wherein each of the first and second lenses is configured to magnify the reference mark and substrate edge for alignment, respectively.

12. The apparatus of claim 9, wherein the bottom surface faces the substrate, wherein a bottom diameter of the bottom opening is smaller than a top diameter of the top opening.

13. The apparatus of claim 12, wherein the optical connector comprises a first lens positioned in the first alignment aperture on or adjacent the top surface and a second lens positioned in the second alignment aperture on or adjacent the top surface, wherein each of the first and second lenses is configured to magnify the reference mark and substrate edge for alignment, respectively.

14. The apparatus of claim 9, wherein an adhesive fixes the optical connector to the substrate.

15. The apparatus of claim 9, wherein the substrate edge is defined by a top surface of the substrate and an edge surface of the substrate, wherein the reference mark is positioned on the top surface of the substrate, wherein the optical connector is spaced apart a gap distance from the edge surface of the substrate.

16. A method comprising:
   positioning an optical connector relative to a substrate, the substrate comprising an optical waveguide extending along a longitudinal direction from a substrate edge and a reference mark spaced away from the optical waveguide and extending from the substrate edge;
   aligning a first alignment aperture of the optical connector with the reference mark;
   aligning a second alignment aperture of the optical connector with the substrate edge, each of the first and second alignment apertures extending through the optical connector between a top surface of the optical connector and a bottom surface of the optical connector; and
   fixing the optical connector to the substrate.

17. The method of claim 16, wherein fixing the optical connector to the substrate comprises curing a photo curable adhesive between the optical connector and the substrate.

18. The method of claim 16, wherein aligning the first alignment aperture of the optical connector comprises aligning a center of the first alignment aperture with an intersection of the reference mark and the substrate edge.

19. The method of claim 16, further comprising cleaving the substrate perpendicular to the longitudinal direction to define the substrate edge prior to positioning the optical connector relative to the substrate.

20. The method of claim 16, wherein aligning the second alignment aperture comprises rotating the optical connector about the reference mark to align the second alignment aperture with the substrate edge after aligning the first alignment aperture with the reference mark.

* * * * *